United States Patent

[11] 3,579,786

[72] Inventor Theodore C. Johnson
 6011 Briardall Lane, Solon, Ohio 44139
[21] Appl. No. 818,749
[22] Filed Apr. 23, 1969
[45] Patented May 25, 1971

[54] HOSE STRAIGHTENING DEVICE
 8 Claims, 9 Drawing Figs.
[52] U.S. Cl. ................................................. 29/200,
 29/235
[51] Int. Cl. ..................................................... B23p 19/00,
 B23p 19/02
[50] Field of Search .......................................... 29/200,
 235, 200 (P), 200 (J), 200 (B)

[56] References Cited
UNITED STATES PATENTS
3,373,474 3/1968 Doerer .......................... 29/200

3,378,909 4/1968 Esposito ...................... 29/235

Primary Examiner—Thomas H. Eager
Attorney—Meyer, Tilberry and Body

ABSTRACT: A device for holding straight a short length of normally curved semirigid hose while metal fittings of an external diameter greater than the internal diameter of the hose are forced into the ends of the hose. The device consists of a pair of clamping members somewhat shorter than the hose arranged to clamp the central portions of the hose straight, in combination with a pair of supporting fingers at opposite ends of the clamping members. The fingers are biased in a direction to straighten the ends of the hose projecting beyond the clamping members, the fingers being yieldingly supported to allow expansion of the hose ends as the fittings are forced thereinto.

PATENTED MAY 25 1971 3,579,786
SHEET 1 OF 3
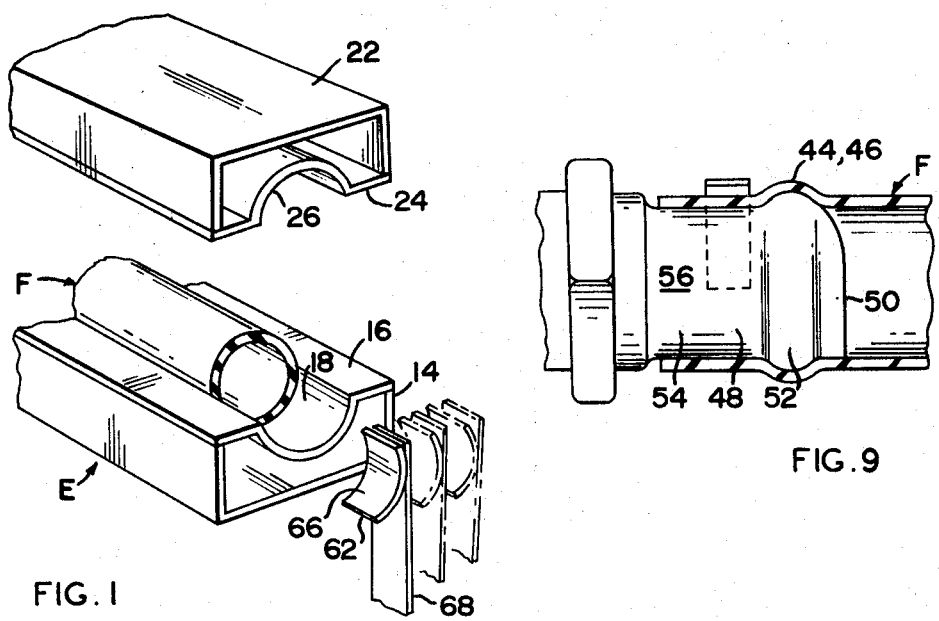
FIG. 1
FIG. 9
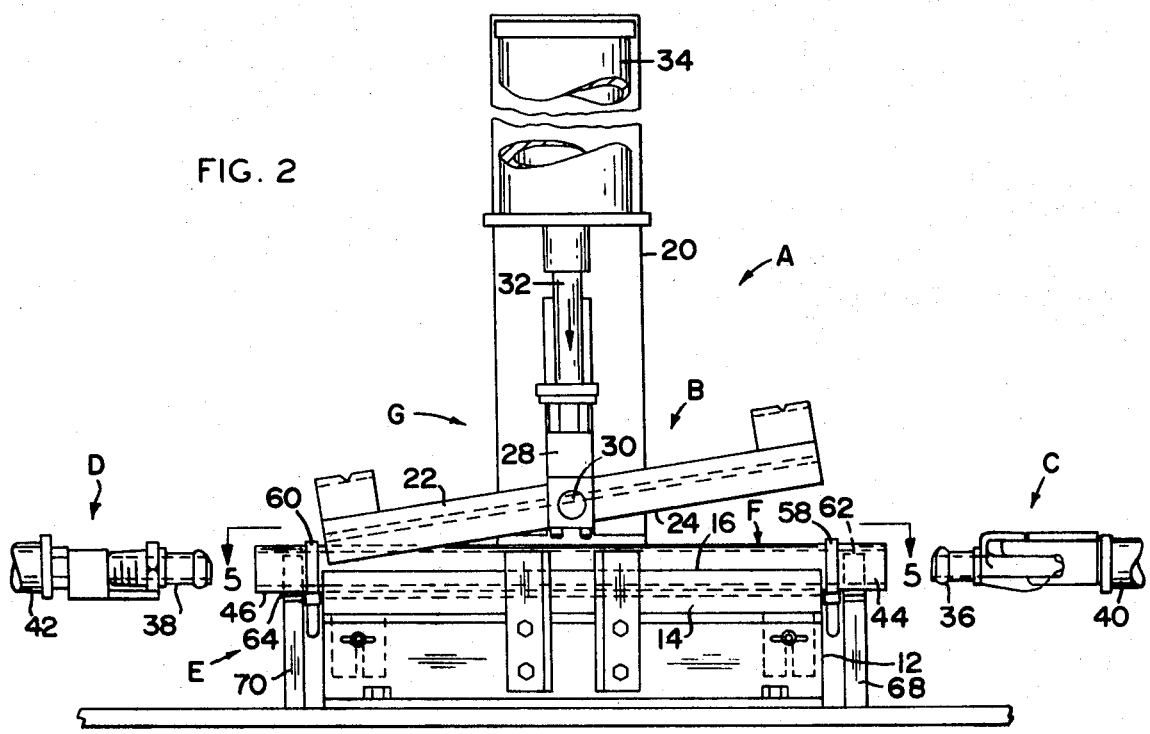
FIG. 2
INVENTOR.
THEODORE C. JOHNSON
BY
Meyer, Tilberry & Body
ATTORNEYS

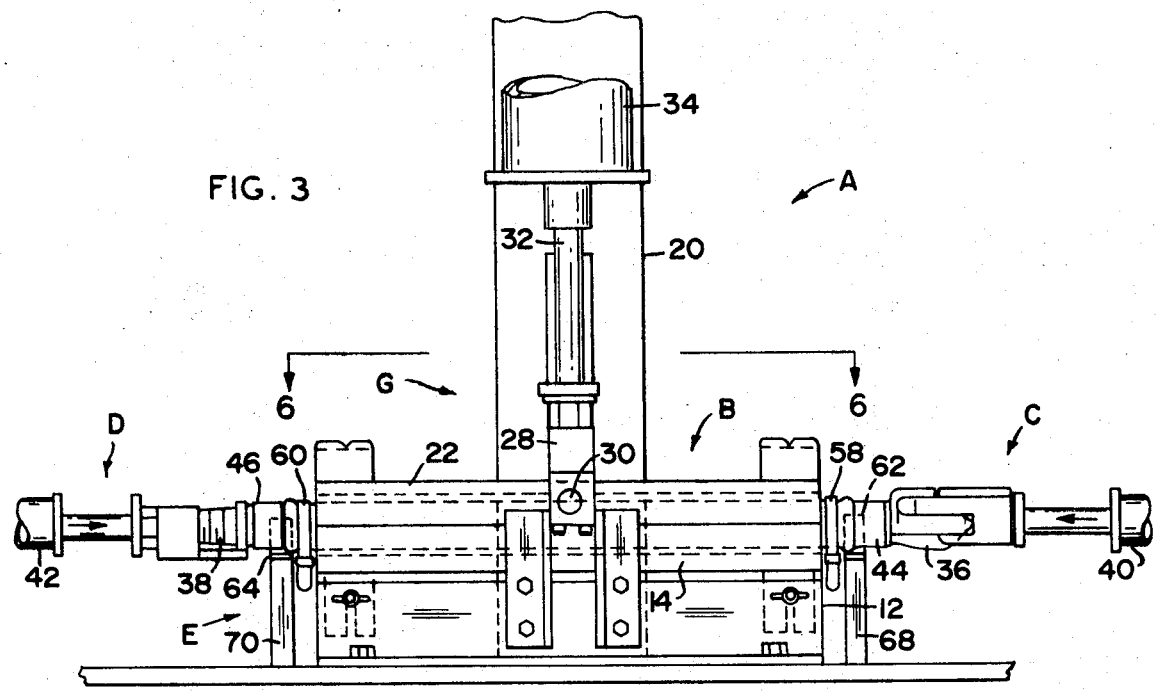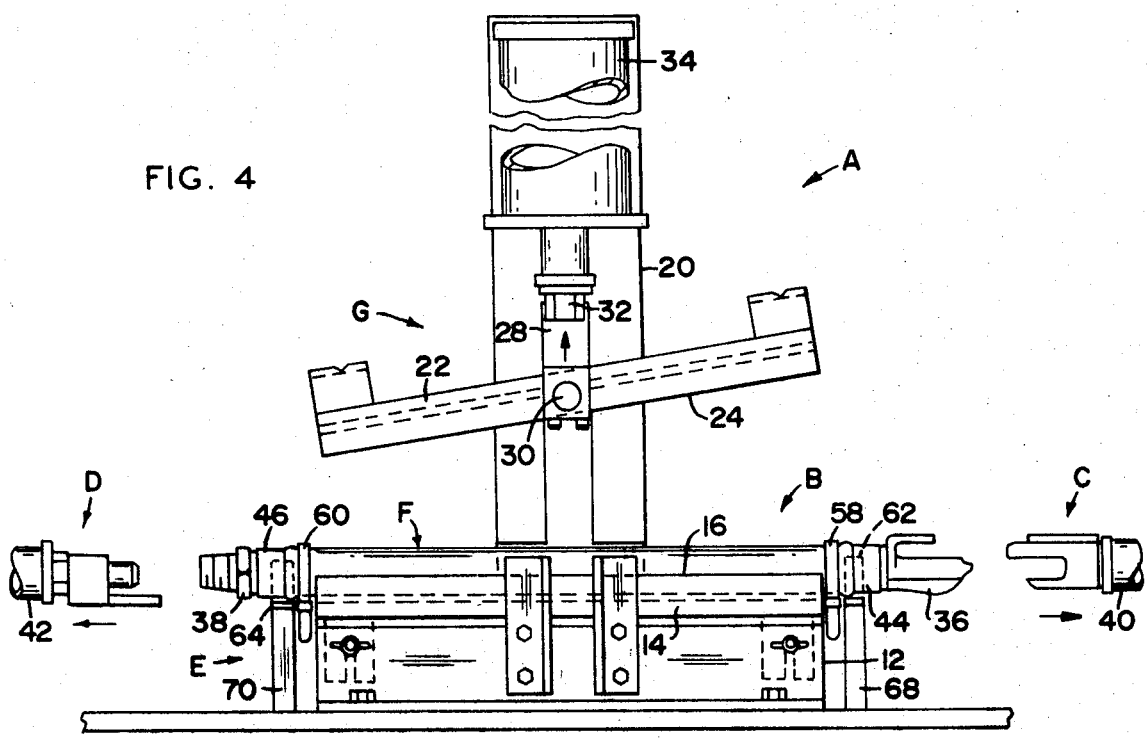

FIG. 5
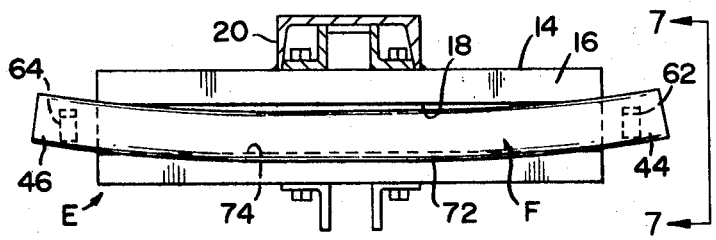
FIG. 6
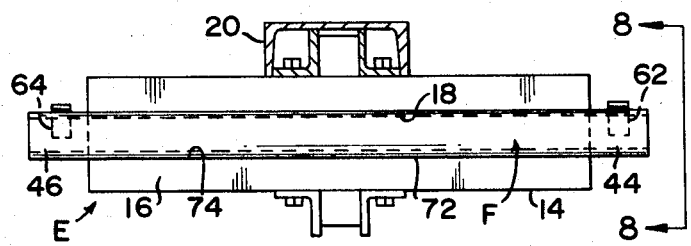
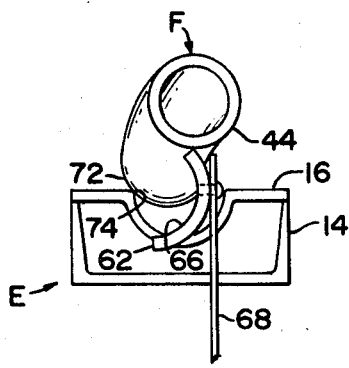
FIG. 7
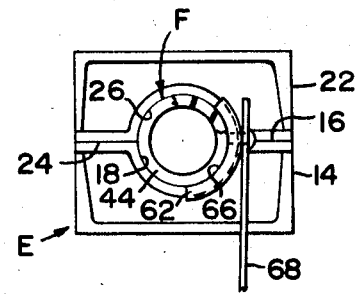
FIG. 8
INVENTOR.
THEODORE C. JOHNSON
BY
*Meyer, Tilberry & Body*
ATTORNEYS

HOSE STRAIGHTENING DEVICE

The present invention relates to an assembly jig, and more particularly to a hose-clamping and straightening device.

The invention is particularly applicable to assembly of railroad airbrake hoses and hose fittings, and will be described with particular reference thereto, although it will be appreciated that the invention has broader applications.

U.S. Pat. No. 1,866,644 describes a type of hose and hose fitting which is used for railroad airbrake systems. In particular, this patent describes a hose assembly comprised of a short length of hose with a nipple fitting clamped in one end and a coupler fitting clamped in the other end. To securely clamp these fittings in the hose both are provided with a cylindrical end and, spaced from the end, an annular rounded bead of much greater circumference than the inside of the hose, over which the section of airhose is forced. On the side of the bead removed from the cylindrical end, the hose is securely held onto the nipple or coupler fitting by a ring clamp.

As can be imagined, these hose sections are subjected to substantial stresses and very severe conditions. Often they are left dangling from the railroad cars, and are subjected to banging and frequent contact with flying objects. In addition they must be able to withstand high internal air pressures, very low temperatures and corrosive conditions. Because of the severe stresses and conditions to which they are subjected, the hoses are specially designed and constructed to be strong and rigid, rendering it difficult during assembly to force the hose ends over the beads of the hose nipple and coupler fittings.

Assembly of the fittings to the hose ends has been facilitated by the use of jigs including an elongated cradle to contain the hose, and a clamp of the same length to frictionally hold the hose longitudinally in the cradle. At opposite ends of the cradle, piston actuated rams or holders supporting the nipple and coupler fittings force them into the hose ends while the hose is clamped in the machine cradle.

The problem which is experienced is that the hose sections have a natural bend or curvature caused by the fact that the hoses during manufacture are cured on large diameter reels.

Not only are the hose sections normally curved, but the radius of curvature of one hose section may be different from that of another, depending upon whether the hose section is taken from a first, second, third or other wrap on the reel.

In the assembly operation, because of the curvature of the hose, it is necessary for the operator to hold the hose within the jig cradle during the clamping step while the clamp is brought down against the hose. Even then, because the hose fittings, particularly the beads thereof, cause the hose to bulge outwardly when the fittings are inserted within the hose, the cradle and clamp which engage the hose must be of shorter length than the hose by the amount equal to the penetration of the fittings. Though the length of hose extending beyond the cradle and clamp may be only in the order of a few inches, the curvature in these extending portions is sufficient to throw them out of alignment with the piston actuated rams which support the fittings.

Accordingly, the operator's hands still must be utilized to hold the hose ends straight during the step of assembling the fittings within the hose ends. Complicating the clamping and assembly steps is the need on the part of the operator to actuate the machine controls, and because the hose ends have to be held in both steps, substantial operator time is lost in the overall operation.

The present invention overcomes the above referred to problems and others in a simple and economical manner.

In accordance with the invention, there is provided, in combination with a device of the general type described including clamping members arranged to frictionally hold and straighten a central portion of hose with the ends of the hose projecting beyond the ends of the clamping members, a means for straightening the projecting hose ends comprising a pair of fingers spaced from the clamping member ends biased in a direction to force the hose ends into alignment with the straightened center portion thereof, the fingers being yieldingly supported to allow expansion of the hose ends as fittings, and rounded beads thereon, are forced within the hose ends.

In accordance with an aspect of the invention, the fingers are cup-shaped and have a concave surface generally facing the front side of the clamping members, the radius of the surface being substantially equal to the outside radius of the hose ends engaged thereby.

Preferably, the fingers each define an arc which extends from about the bottommost plane of the cradle upwardly terminating in an upper lip, the fingers being supported on arm means generally vertically oriented.

Accordingly, it is a principle object of the invention to provide an assembly jig particularly suitable for the assembly of airbrake hose systems, which overcomes the disadvantages of prior assembly mechanisms.

In particular, it is an object of the present invention to provide an improved hose straightening device for the assembly of a hose and hose fittings which automatically holds the hose ends straight and aligned with fitting holders, regardless of the radius of curvature of the hose, and which at the same time is adapted to accommodate expansion of the hose ends by the hose fittings inserted therein.

The invention, objects and advantages thereof will become apparent upon consideration of the following specification, with reference to the accompanying drawings, in which FIG. 1 is an exploded, enlarged, perspective view illustrating a portion of a hose-straightening device in accordance with the concepts of the invention;

FIGS. 2, 3 and 4 illustrate the assembly jig front view and its operation in accordance with the concepts of the present invention;

FIGS. 5—8 illustrate principles of operation of the hose-straightening device of FIG. 1, FIG. 5 being a section view taken along line 5–5 of FIG. 2; FIG. 6 being a section view taken along lines 6–6 of FIG. 3; FIGS. 7 and 8 being section views taken along lines 7–7 and 8–8, respectively of FIGS. 5 and 6; and FIG. 9 is a partial section view of a hose and hose fitting.

Referring to the drawings, there is illustrated an assembly jig A which includes a hose-straightening device B, and on opposite sides of the device, hose-fitting holders C and D, the straightening device including a lower cradle mechanism E adapted to hold a hose F. Above the cradle mechanism is a hose clamping mechanism G.

Turning to the drawings in detail, and in particular FIGS. 1—4, the lower cradle mechanism E of the hose-straightening device B is comprised of a lower frame member 12, the frame member supporting a channel 14 which in the upper surface 16 thereof defines a longitudinally extending half-round trough or cradle 18 (FIG. 1) in which the hose F is adapted to be seated. The cradle is approximately U-shaped having an inside diameter which is substantially the same as the outside diameter of the hose positioned therein.

Above the lower cradle mechanism, the clamping mechanism G is supported on an upper frame 20, extending vertically above the lower frame 14, the clamping mechanism G comprising a longitudinally extending upper channel 22 which defines in the lower surface 24 thereof (FIG. 1) a downwardly facing longitudinally extending half-round trough or cradle 26. As with the lower cradle 18, the upper cradle 26 is semicircular in shape, having an inside diameter which is substantially equal to the outside diameter of the hose being straightened.

The upper and lower channels 22 and 14 are substantially coextensive with each other, the upper channel having a normal position (FIG. 4) which is spaced from the lower channel 14, and a lower clamping position (FIG. 3) where it is in engagement with the lower channel. In the lower or engaging position, the upper channel 22 cooperates with the lower channel to engage the hose F frictionally along a substantial portion of its length around its entire periphery, the frictional engagement by the channels 22 and 14 preventing axial movement of the hose within the hose-straightening device.

To move the upper channel between its upper normal position (FIG. 4) and its lower clamping position (FIG. 3), the clamping mechanism is provided with a vertically movable ram 28 which supports the channel 22 at pivot point 30, the ram being movable vertically on piston 32 driven by double acting air chamber 34. Controls (not shown) are provided for raising and lowering the ram 28.

A purpose of pivotally supporting the upper channel 22 is to permit the channel and hose to align automatically with each other during the clamping step in the event of slight misalignment of the hose in the lower cradle 18.

At opposite ends of the lower channel 14, or on opposite sides of the lower cradle mechanism E, the assembly jig A is provided with axially movable holders C and D which support fittings 36 and 38 (FIGS. 2—4). These holders are movable horizontally on piston members 40 and 42 towards and away from the hose ends 44 and 46 by means of double-acting pneumatic or electrical actuators (not shown). The axes of movement of the holders C and D are aligned with the axis defined by the upper and lower cradles 18 and 26. In the embodiment illustrated, the right-hand holder C supports a coupler fitting, whereas the left-hand holder D supports a nipple fitting.

The hose F is placed in the lower cradle 18, with the upper channel 22 spaced from the lower channel, and the upper cradle is lowered into engagement with the hose (FIGS. 2 and 3) clamping on the hose. Following this, the right and left holders C and D are simultaneously actuated towards the hose ends 44 and 46, the fittings thereby being inserted within the hose ends. Subsequently, the fittings are released from the holders C and D (by mechanisms not shown) and the holders are retracted to their original positions spaced from the hose ends (FIG. 4). The upper channel 22 then is retracted to its normal position spaced from the lower channel, and the hose F is removed from the lower channel by the operator.

From the above, it is apparent that the purpose of the upper channel 22 and cradle 26 is simply to clamp the hose F against the lower cradle 18 to prevent axial movement of the hose during the assembly operation, the holders C and D being movable to the extent required to insert the fittings a substantial distance within the hose ends.

As mentioned, details of the hose and hose fittings are shown in U.S. Pat. No. 1,866,644. Broadly, these details are shown in FIG. 9, both of the hose fittings, the nipple and the coupler, being provided with a cylindrical body portion 48 having removed from the free end 50 thereof a rounded radially extending bead 52 of substantial height, and substantially greater diameter than the inside diameter of the hose. On the side 54 of the bead removed from the end 50, the fitting is provided with a cylindrical surface 56 of substantial axial length. When the fitting is inserted within a hose end (44, 46) the hose expands and rides over the rounded bead and rearwardly along the cylindrical surface 56 a distance sufficient to accommodate an external ring clamp (58 and 60, FIGS. 2, 3 and 4) encompassing and engaging the periphery of the hose over the surface. These hoses are subjected to severe pulling stresses, and very high internal pressures, so that the bead 52 has to be of substantial height to prevent the hose from being pulled or forced from the fitting.

Accordingly, with reference to FIG. 3, since the upper and lower cradles 18 and 26 are in frictional engagement with the entire circumference or periphery of the hose in a lengthwise direction, the expansion of the hose, particularly by the annular bead 52 of the fittings, clearly prevents the hose from being engaged longitudinally along its full length by the upper and lower cradles. For this reason, the upper and lower cradles, or channels 22 and 14, are dimensioned lengthwise so that at opposite ends of the channels, the lengths of hose 44 and 46 are exposed, which lengths are sufficient to accommodate penetration by the fittings 36 and 38.

It was mentioned that the hose sections have a normal curvature, resulting from the fact that the hoses are cured on a hose reel, the radius of curvature varying depending upon the wrap from which the hose section is taken. Although the lengths of the hose ends exposed on opposite sides of the cradle mechanism E are only small, in the order of a few inches, it was mentioned that the curvature in these exposed ends is sufficient to displace the end openings from alignment with the holders C and D and fittings supported thereon. The extent of this curvature and the extent of displacement is illustrated in FIG. 5, the exposed ends 44 and 46 being substantially out of alignment with the axis of the lower channel 18, and correspondingly, with the axes of movement of the holders C and D.

The extent of the curvature is such that even following clamping by the upper and lower channels 22 and 14, the hose ends 44 and 46 are out of alignment with the holders C and D.

Heretofore, it was necessary for the operator to hold these hose ends 44 and 46 during the assembly step, as well as during the clamping step.

In accordance with the present invention the hose ends are automatically held in alignment with the axis of the cradle 18 and accordingly in alignment with the axes of movement of the holders C and D. This is accomplished by providing at opposite ends of the cradle 18, or on opposite sides of the cradle mechanism E, fingers 62 and 64 which are adapted to engage the hose ends. As shown in FIGS. 1, 7 and 8, these fingers are arcuate provided with cup-shaped or concave surfaces 66 which have about the same radius as the outside surface of the hose (or inside surface of cradle 18), so that they are adapted to engage the outer surface of the hose over a portion of the periphery thereof. The arcuate length of the fingers is such that they extend from about the 6 o'clock position, where they contact the base of the hose, to about the 2 o'clock position curving slightly in an upper lip 76 onto the upper surface of the hose. Both of the fingers 62 and 64 are arranged so that they face the front of the machine, the fingers having a normal position (FIG. 7) spaced slightly in front of the plane defined by the cradle 18, or between said plane and the plane of the axis defined by the cradle. The fingers are supported on flexible or resilient arms 68 and 70, made of flat spring steel material, and extend in an upright direction so that the fingers, because of the flexibility of the arms, are adapted to deflect generally radially away from the plane of the cradle axis.

FIGS. 5—8 illustrate operation of the fingers. Initially, as shown in FIGS. 5 and 7, the curved hose F is centered in the cradle mechanism with the larger radius surface 72 of the hose bearing against the front edge 74 of the cradle 18, the hose ends 44 and 46 lying on top of the upper edges of the fingers 62 and 64. The operator then grasps the hose ends straightening the hose and forcing the ends downwardly into and against the concave surfaces 66 of the fingers. The stiffness in the hose causes the upstanding, spring steel arms 68 and 70 to bend, the design of the arms being such as to give that amount necessary to locate the fingers, regardless of the hose curvature, substantially in the plane of the cradle 18. In this way, the fingers hold the hose straight, and the hose ends 44 and 46 substantially in alignment with the holders C and D.

The small extent of the lip 76 of each finger which extends over the hose is sufficient to retain the hose in place until the upper channel 22 is brought down into clamping engagement with the hose.

It is an important feature of the invention that the flexibility of the arms 68 and 70 also is sufficient to permit expansion of the hose exposed ends 44 and 46 on penetration of these ends by the fittings 36 and 38. In this way, the fingers successfully hold the hose straight for the assembly step, without in any way obstructing or blocking the assembly.

The deflection of the fingers during the clamping and assembly steps is illustrated in FIG. 1.

Although the lower channel 14 is shown as horizontally oriented, and the ram 28 as movable in a vertical plane, away from and towards the lower channel 14, it is to be understood that other orientations are possible and within the scope of the present invention. For instance, the channel 14 can be oriented on its side so that the cradle 18, instead of being open upwardly, faces in a horizontal direction roughly at 90° to the direction shown in FIG. 1, with the ram 30 movable horizontally towards and away from the channel to clamp on a hose section.

Also although the configuration of the fingers 58 and 60 illustrated in the drawings is preferred, obviously other configurations for the fingers, within the scope of the present invention are available. In this respect, the fingers may be suspended differently, for instance from upper downwardly extending arms, and in other ways, it being understood that various means of suspension are within the scope of the invention.

Also, the hose may have to be placed in the machine with its curvature facing upwardly, rather than rearwardly as shown in FIG. 5, or even forwardly. Which direction the hose curvature takes depends, following well known principles, upon the orientation of the coupler and nipple, and upon hose assembly specifications. Regardless of how the hose is oriented, the fingers can be correspondingly positioned and biased to straighten the hose following hose clamping.

Although the invention has been described with reference to a specified embodiment, other variations within the scope of the following claims will be apparent to those skilled in the art.

I claim:

1. A hose-straightening device comprising:
   an elongated cradle adapted to receive a section of hose, said cradle having a longitudinally extending axis, and a length slightly less than the hose to be positioned therein leaving exposed hose ends;
   clamping means adapted to clamp a hose in said cradle against longitudinal movement in the cradle;
   finger means adjacent the ends of said cradle adapted to engage said hose ends; and
   resilient means supporting said finger means, said finger means being biased toward said ends for aligning said ends with the cradle axis and displaceable radially outwardly therefrom when said hose ends are expanded by the insertion of fittings thereinto.

2. A device according to claim 1 wherein the resiliency of said resilient means is such that the finger means is substantially coplanar with said cradle following clamping of the hose and engagement of said finger means with said hose ends.

3. A device according to claim 2 wherein said clamping means is coextensive with said cradle, the cradle and clamping means frictionally engaging substantially the full periphery of the portion of hose clamped therein.

4. A device according to claim 2 wherein said finger means are concave engaging a portion of the circumference of the hose ends, the radius of the finger means being equal substantially to the radius of the cradle.

5. A device according to claim 4 wherein said finger means engages said hose ends from about the 6 o'clock position to about the 2 o'clock position thereon, said device having front and rear sides parallel to said cradle, the finger means concave surfaces facing forwardly.

6. A device according to claim 5 further including vertically oriented arm means supporting said finger means.

7. A device according to claim 1 wherein said clamping means is movable in a vertical plane.

8. An assembly jig for hose and hose fittings comprising:
   a hose straightening device including a frame means;
   an elongated cradle in said frame means adapted to receive a section of hose, said cradle defining a longitudinally extending axis and a curved plane encompassing said axis;
   clamping means adapted to clamp a hose in said cradle against longitudinal movement in the cradle, said clamping means being substantially coextensive with said cradle, and adapted to engage with the cradle substantially the full periphery of a section of hose clamped therein;
   said cradle and clamping mechanism having a length slightly less than the hose leaving exposed hose ends;
   finger means adjacent the ends of said cradle adapted to engage said hose ends;
   resilient means supporting said finger means, said finger means being normally adjacent the plane of said cradle axis and displaceable radially outwardly away from said plane to a first position substantially coplanar with said cradle by said hose ends;
   said jig further comprising opposed ram means each adapted to hold a hose fitting, said ram means being positioned adjacent the ends of the straightening device elongated cradle;
   means for moving said ram means axially towards and away from said cradle to insert the hose fittings in the hose ends;
   said finger means being further radially displaceable to a second position by the expansion of the hose ends from the fittings inserted therein.